Oct. 12, 1965     L. O. ROGERS, JR     3,211,849
PNEUMATIC TIRE LOW PRESSURE ACTUATED SWITCH
Filed June 14, 1963     2 Sheets-Sheet 1
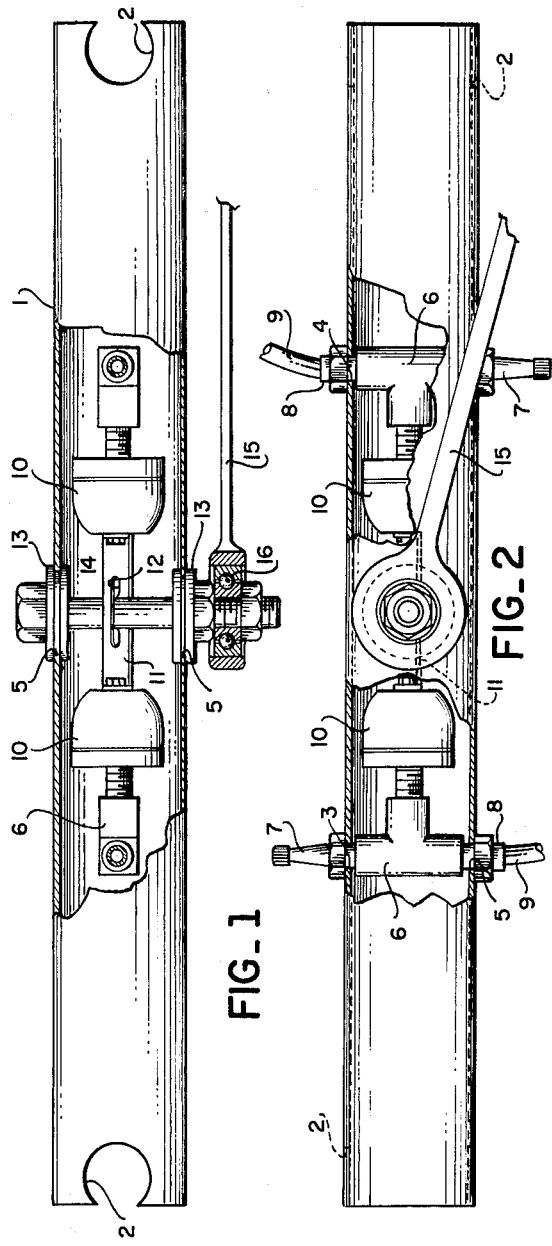
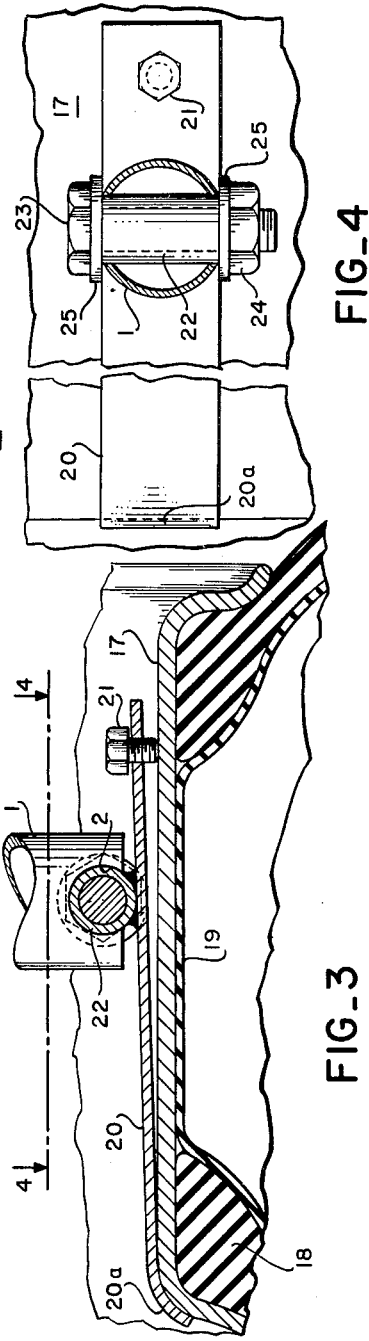
INVENTOR.
LEONARD O. ROGERS, JR.
BY *Albert L. Carter*
Attorney Oct. 12, 1965  L. O. ROGERS, JR  3,211,849
PNEUMATIC TIRE LOW PRESSURE ACTUATED SWITCH
Filed June 14, 1963  2 Sheets-Sheet 2

INVENTOR.
LEONARD O. ROGERS, JR
BY *Albert L. Carter*
Attorney

United States Patent Office
3,211,849
Patented Oct. 12, 1965

3,211,849
PNEUMATIC TIRE LOW PRESSURE
ACTUATED SWITCH
Leonard O. Rogers, Jr., Box 117, Norman Park, Ga.
Filed June 14, 1963, Ser. No. 287,964
8 Claims. (Cl. 200—61.25)

This invention relates to a low pressure alarm indicating device for pneumatic tires, and more particularly to such a device for use on dual wheel installations.

The loss of air pressure below a certain minimum in one of a pair of tires in a dual wheel or dual tire installation on an automotive or truck vehicle can occur during travel, as well as actually at any time, unnoticed by the driver or operator; the result being that a substantial amount of heat in the low pressure tire can build up causing either a catastrophic failure of the tire by a blowout explosion or the separation of the tread from the tire casing in the case of a retread or recapped tire. Also, this build up of heat in a tire due to operation at low tire pressures has been known to start combustion of the tire with the fire in turn causing damage to either or both the vehicle and any cargo being carried thereby.

Indicating or signaling devices of the same general type as this invention are known in the prior art. However, all of the prior art devices involve at least one of a number of disadvantages inherent in such heretofore known devices. For example, some prior known devices require an actual modification of existing wheel and hub structures, while other known devices require removal of the wheel structure along with other equipment so as to constitute a substantial job of disassembly and reassembly. Additionally, prior known devices further include arrangements which are most difficult to remove, do not permit easy inspection of the device when installed, and are incapable of easy transfer from one installation to another if transfer is capable at all. All of these difficulties are eliminated by practice of this invention.

Accordingly, it is an object of this invention to provide a tire low pressure indicator structure that is completely independent of the wheel and hub while easily mountable thereto without modification to the existing wheel and hub structure.

It is a further object of this invention to provide a tire low pressure indicator structure that can be easily installed from outside of the truck without requiring disassembly or removal of the wheel or other associated or similar equipment for installation of the indicator structure.

A still further object of this invention is to provide a tire low pressure indicator structure that is diametrically mounted with substantially identical parts arranged equally about the axis of rotation of the wheel so as to avoid affecting any already existing wheel and tire balance.

Another object of this invention is to provide a tire low pressure indicator structure for a dual wheel installation that results in a much more readily available location of valve stems for both tires from the exterior side of the wheels on a dual wheel installation, as well as to provide a structure capable of withstanding the elements.

Yet a further object of this invention is to provide a tire low pressure indicator structure with no movable joints or connections through which air can leak.

And still further it is another object of this invention to provide a tire low pressure indicator having a unique simplicity of relatively few and inexpensive parts capable of easy servicing as well as being a reusable structure, whether on the same wheel or another one.

Other objects and advantages will become apparent from considering the following explanation in conjunction with the following drawings in which:

FIGURE 1 is a partial cross-sectional view of one embodiment of the low pressure indicator structure of this invention;

FIGURE 2 is a partial cross-sectional view of the indicator structure of FIGURE 1 rotated 90 degrees about its longitudinal axis;

FIGURE 3 is a cutaway cross-sectional view showing the details of mounting the structure of FIGURES 1 and 2 to a wheel rim;

FIGURE 4 is a view taken along line 4—4 of FIGURE 3;

Figure 6:
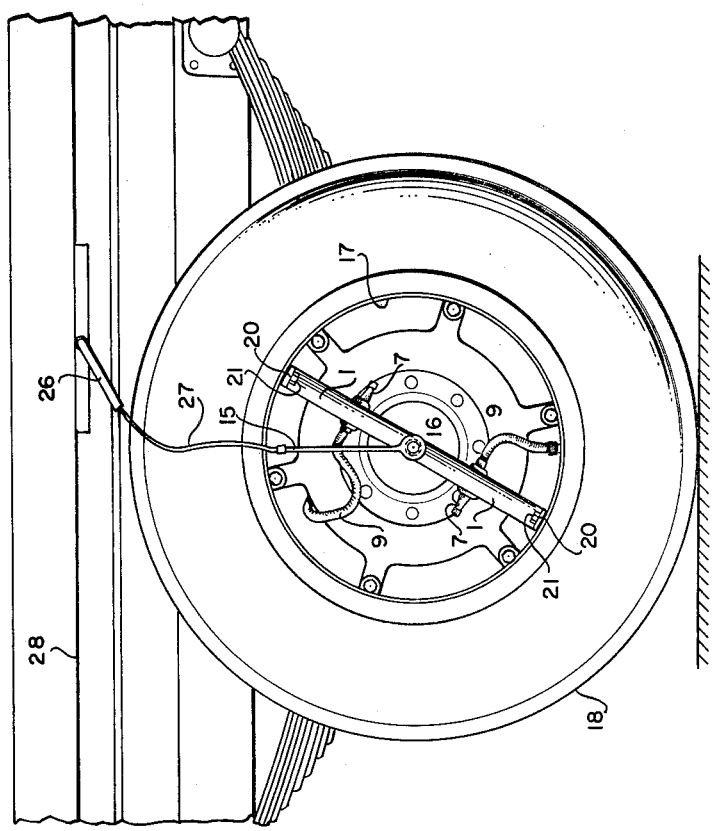

Generally stated, the invention comprises a tubular body member mounted in compression diametrically across the inner wheel or rim diameter of the outer wheel of a dual wheel assembly. Within the tubular body member are located a pair of pressure switches, each connected by a pipe or tube to the valve stem of one of the tires in the wheel assembly. Each pressure switch is electrically connected to a bolt or shaft extending through the body member normal to the longitudinal axis thereof and electrically insulated therefrom. An electrically conducting member interconnects the shaft, through a roller bearing, to the vehicle and to an appropriate signaling circuit, e.g. the horn, headlight or other appropriate signaling circuit, whether it be visible or audible. The pressure switches and other structural parts contained within the tubular body member are arranged substantially equally about the axis of rotation of the wheel so as to minimize, if not eliminate, any effect on any already balance of the wheel and tire assembly.

More specifically, in FIGURES 1 and 2 there is shown a tubular body member 1 having an arcuate cutout 2 at each end that is greater than a semicircle. Intermediate the ends of tube 1 are three pairs of holes 3, 4 and 5, each pair aligned substantially through the tube 1 and perpendicular to the longitudinal axis thereof, with the axial alignment of holes 5 being perpendicular to the parallel axial alignments of holes 3 and 4.

A three-way connector or T-joint 6 is located within tube 1 and in alignment with holes 3 so as to permit connection of a conventional pneumatic tire valve stem member 7 to pass through one hole 3 for threaded connection with T-joint 6. An appropriate connector 8 is passed through the other hole 3 and threadedly connected to T-joint 6, the other end of connector 8 adapted to effect a connection with a flexible hose 9, the purpose of which will be explained in more detail hereinafter. A similar arrangement is provided for holes 4 with the only exception being that the valve stem members 7 extend from opposite sides of tube 1 as well as do the connectors 8 as can best be seen in FIGURE 2, the purpose of which will also be pointed out hereinafter.

A pressure switch 10 is connected to each T-joint 6; the pressure switches 10 in turn connected together by an electrically conductive band or strap member 11 which has an opening or slot 12 located intermediate therein.

Electrically insulated from tube 1 by Teflon washers or bearings 13 located in holes 5, or by other appropriate insulating material, is a bolt 14, which in its passage through tube 1 passes through the opening 12 in band 11 as is best seen in FIGURE 1. An arm or rod 15 is mounted to bolt 14 on the outside of tube 1 through a bearing 16 so as to permit a relative rotation of rod 15 about bolt 14 and the axis thereof.

Referring now to FIGURES 3 and 4, the preferred arrangement for mounting the tube 1 to the inner surface of a wheel rim 17 having a conventional pneumatic tire 18 and inner tube 19 as shown. This arrangement consists of a mounting bar 20 having a bolt 21 threadedly engaged proximate one end thereof with the other end being formed to provide an arcuately deflected portion 20a which fits or curves around the inner edge of wheel rim 18 as can best be seen in FIGURE 3. Between the center of mounting bar 20 and the location of bolt 21 is located a tubular lug 22 which extends across the width of mounting bar 20 and is formed integral therewith or secured thereto such as by welding or any other appropriate manner. The outer diameter or surface of lug 22 is sized and shaped to fit within the tubular cutouts 2 in tube 1; the connection between tube 1 and lug 22 of mounting bar 20 being maintained by a bolt and nut 23 and 24 respectively as best seen in FIGURE 4. Washers 25 may be utilized to assure retention of the connection between lug 22 and tube 1.

Figure 5:
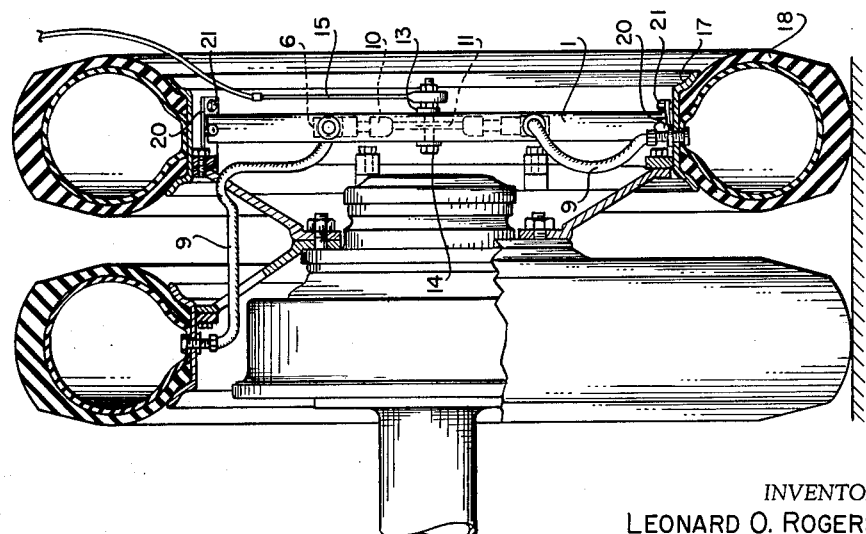
FIGURE 5 is a partial cross-sectional view showing the indicator structure of FIGURES 1 and 2 installed on a dual wheel installation; and, FIGURE 6 is an elevational view of the installation of FIGURE 5.

By making the mounting bar 20 of a material having a substantial degree of flexural resiliency, such as spring steel, the mounting of tube 1 on a wheel rim 17 is accomplished by first connecting a mounting bar on each end of tube 1 and then inserting this assembly inside of a wheel rim such as can best be seen in FIGURES 5 and 6, with the offset portion 20a of mounting bar 20 engaging with the corner of rim 17 as best seen in FIGURE 3. With appropriate turning or torquing of bolts 21, the outer ends of mounting bars 20 will tend to move toward each other as they pivot slightly about their respective offset portion contacts with the wheel rim edge thusly placing tube 1 in compression as it becomes rigidly mounted within the wheel rim 17. The flexible hoses 9 are then connected to the valve stems of the tires 18 whereupon the valve stem members 7 mounted on tube 1 become the valve stems for checking the tire pressures or putting air into the tires, the readily accessible locations of valve stem members 7 making such chores relatively easy.

Likewise, with this method of mounting the tube 1 to the wheel rim 17, it can be seen that the low pressure tire warning structure of this invention can be quite readily removed if need be for the case of servicing or removal of a wheel, as well as the structure can be removed and placed on another wheel rim with ease.

Referring now specifically to FIGURES 5 and 6, tube 1 is shown securely mounted within tire rim 17 with rod 15 connected to an electrical conducting member 26 through an interconnecting electrical conductor 27, and could be of a spring material. Member 26 is mounted to frame 28 of the vehicle in any appropriate manner and in turn is connected into the electrical circuit of any appropriate or desired warning or signaling device, such as the horn circuit of the vehicle, the light circuit of the vehicle, or any other appropriate or desired arrangement such as a special light or buzzer located within the cab of the vehicle. The conductor member 26 is electrically insulated from the vehicle frame 28 so as to prevent a short circuit therewith as the wheel rim 17 is connected electrically along with both the frame 28 and tube 1 between the electrical energy source such as the battery of the vehicle and ground whereby the closing of the signal circuit only takes place upon the actuation of one of the pressure switches 10 upon the loss of pressure in one of the tires 18 below a predetermined level. By the use of insulative type material for the washers or bearings 13 between the bolt 14 and tube 1, the closing of the circuit only takes place upon actuation of one of the pressure switches 10 as the electric current passes from pressure switch 10 through the strap 11 to bolt 14 and rod 15.

While the simplicity of this invention does not provide for the warning signal to indicate which of the several tires on a vehicle may have low pressure, it is of course to be realized that once the signal is tripped, the tire having the low pressure may be easily spotted visually or found by the simple expediency of checking the tire pressures with a pressure gauge.

It can also be seen that by mounting the tube 1 diametrically across the tire rim 17, with the T-joints 6 and pressure switches 10 located equidistant from the center or rotating axis of the tube 1 when mounted on the wheel, the balance of the wheel and tire is substantially maintained.

The entire unit can easily be removed in the event a tire or wheel has to be removed or changed by simply disconnecting conductor 27 from either member 26 or rod 15 and loosening the bolts 21 on mounting bar 20, and removal of the tube 1 after disconnecting the connections of flexible hoses 9 from the valve stems of the tires. Once the tire and wheel assembly is reconnected to its proper position, the tube assembly is easily relocated and reconnected within a matter of a few minutes.

While a particular embodiment of the invention has been shown and described, it will be obvious to those skilled in the art that various changes and modifications may be made without departing from the invention and it is intended to cover in the appended claims all such modifications and equivalents as fall within the true spirit and scope of this invention.

What is claimed is:

1. An article of manufacture comprising in combination:

an elongate tubular member;
 a pair of pressure switches contained within said tubular member, one of said pressure switches located intermediate each end and longitudinal center of the tubular member;
 a first electrical conducting means contained within the tubular member and interconnecting the pressure switches; and,
 a second electrical conducting means in electrical contact with said first electrical conducting means and extending through the tubular member wall, said second electrical conducting means electrically isolated from the tubular member.

2. An article of manufacture as claimed in claim 1 including:

a fluid connector T-joint located intermediate each pressure switch and end of the tubular joint;
 the center connection of each said T-joint connected to the pressure switch on the same side of the tubular member longitudinal center as the pressure switch, and
 the end connections of the T-joint extending through the tubular member wall substantially normal to the longitudinal axis of the tubular member.

3. An article of manufacture as claimed in claim 2 wherein:

the pair of pressure switches and the pair of T-joints are equidistant from the longitudinal center of the tubular member;
 and, the second electrical conducting means is located at the longitudinal center of the tubular member.

4. An article of manufacture as claimed in claim 1 including:

a rod member pivotally connected to the second electrical conducting means externally of the tubular member;
 said second electrical conducting means located at the longitudinal center of the tubular member making said rod member pivotal to the tubular member about an axis perpendicular to the longitudinal axis of the tubular member at the longitudinal center thereof.

5. A low pressure pneumatic tire warning device for locating within the area circumscribed by the inner surface of pneumatic tire wheel rim comprising in combination:

an elongate tubular member;
 a pair of pressure switches contained within said tubular member, one of said pressure switches located intermediate each end and longitudinal center of the tubular member;

a first electrical conducting means contained within the tubular member and interconnecting the pressure switches;

a second electrical conducting means in electrical contact with said first electrical conducting means and extending through the tubular member wall, said second electrical conducting means electrically insulated from the tubular member;

a fluid passage means extending from each pressure switch to the exterior of the tubular member, each said fluid passage means extending through the tubular member wall;

a rod member pivotally connected to the second electrical conducting means externally of the tubular member;

and, a mounting means engageable with each end of the tubular member and adapted to mount the tubular member to the inner surface of a pneumatic tire wheel rim diametrically across the area circumscribed by the wheel rim inner surface.

6. A low pressure pneumatic tire warning device as claimed in claim 5 wherein the fluid passage means comprises a T-joint connector:

the center connection of each said T-joint connected to the pressure switch on the same side of the tubular member longitudinal center as the pressure switch;

and, the end connecions of the T-joint extending through the tubular member wall substantially normal to the longitudinal axis of the tubular member.

7. A low pressure pneumatic tire warning device as claimed in claim 6 wherein:

the pair of pressure switches and the pair of T-joints are each equidistant from the longitudinal center of the tubular member;

and, the second electrical conducting means is located at the longitudinal center of the tubular member.

8. A low pressure pneumatic tire warning device as claimed in claim 5 wherein:

the area defined by the outer surface of the tubular member is round.

No references cited.

BERNARD A. GILHEANY, *Primary Examiner.*

ROBERT K. SCHAEFER, *Examiner.*